(12) United States Patent
Bouazizi et al.

(10) Patent No.: US 8,732,274 B2
(45) Date of Patent: May 20, 2014

(54) METHOD AND APPARATUS FOR GENERATING AND HANDLING STREAMING MEDIA QUALITY-OF-EXPERIENCE METRICS

(75) Inventors: Imed Bouazizi, Tampere (FI); Chenghao Liu, Tampere (FI)

(73) Assignee: Nokia Corporation, Espoo (FI)

( * ) Notice: Subject to any disclaimer, the term of this patent is extended or adjusted under 35 U.S.C. 154(b) by 40 days.

(21) Appl. No.: 13/162,756

(22) Filed: Jun. 17, 2011

(65) Prior Publication Data
US 2012/0151009 A1    Jun. 14, 2012

Related U.S. Application Data

(60) Provisional application No. 61/356,411, filed on Jun. 18, 2010.

(51) Int. Cl.
| | |
|---|---|
| *G06F 15/16* | (2006.01) |
| *H04L 29/06* | (2006.01) |
| *H04L 12/26* | (2006.01) |
| *H04L 12/24* | (2006.01) |
| *H04N 21/414* | (2011.01) |
| *H04N 21/4143* | (2011.01) |
| *H04N 21/442* | (2011.01) |
| *H04N 21/658* | (2011.01) |
| *H04N 21/845* | (2011.01) |
| *H04N 21/2662* | (2011.01) |
| *H04N 21/61* | (2011.01) |

(52) U.S. Cl.
CPC ............... *H04L 65/80* (2013.01); *H04L 43/08* (2013.01); *H04L 41/5067* (2013.01); *H04N 21/41407* (2013.01); *H04N 21/4143* (2013.01); *H04N 21/44209* (2013.01); *H04N 21/4424* (2013.01); *H04N 21/6582* (2013.01); *H04N 21/8456* (2013.01); *H04N 21/2662* (2013.01); *H04N 21/6125* (2013.01)
USPC ...................... 709/219; 348/554; 375/240.08; 375/240.26; 341/23

(58) Field of Classification Search
CPC ..... H04L 65/80; H04L 43/08; H04L 41/5067; H04N 21/41407; H04N 21/4143; H04N 21/44209; H04N 21/4424; H04N 21/6582; H04N 21/8456; H04N 21/2662; H04N 21/6125
USPC ......... 709/219; 348/554; 375/240.08, 240.26; 341/23
See application file for complete search history.

(56) References Cited

U.S. PATENT DOCUMENTS

| | | | |
|---|---|---|---|
| 2005/0089043 A1 | 4/2005 | Seckin et al. | |
| 2007/0116117 A1* | 5/2007 | Tong et al. | ............... 375/240.08 |

(Continued)

FOREIGN PATENT DOCUMENTS

| | | |
|---|---|---|
| EP | 1678888 A1 | 7/2006 |
| WO | 2005/022852 A1 | 3/2005 |
| WO | WO-2010/000946 A1 | 1/2010 |

OTHER PUBLICATIONS

International Search Report and Written Opinion for Application No. PCT/IB2011/052662, dated Apr. 19, 2012.

(Continued)

*Primary Examiner* — Kyung H Shin
(74) *Attorney, Agent, or Firm* — Alston & Bird LLP

(57) ABSTRACT

Various methods for generating and handling streaming media metrics are provided. One example method includes receiving media presentation data, where the media presentation data is associated with a presentation of streaming media, and determining, based on at least the media presentation data, one or more quality of experience metrics that are to be reported. The example method further comprises generating a metric value corresponding to each of the one or more quality of experience metrics, and causing the metric value corresponding to each of the one or more quality of experience metrics to be reported. Similar and related example methods and example apparatuses are also provided.

19 Claims, 9 Drawing Sheets

(56) References Cited

U.S. PATENT DOCUMENTS

| | | | |
|---|---|---|---|
| 2007/0237098 A1 | 10/2007 | Wang | |
| 2008/0162714 A1 | 7/2008 | Pettersson | |
| 2008/0278627 A1* | 11/2008 | Howcroft et al. | 348/554 |
| 2009/0225670 A1 | 9/2009 | Leung et al. | |
| 2010/0245134 A1* | 9/2010 | Black et al. | 341/23 |

OTHER PUBLICATIONS

"QoE for Adaptive HTTP Streaming", 3GPP TSG-SA4 #59, S4-100457, Agenda Item: 8, Nokia Corporation, Prague, Czesh Republic, Jun. 21-24, 2010, pp. 1-3.

"3rd Generation Partnership Project; Technical Specification Group Services and System Aspects; Transparent end-to-end Packet-switched Streaming Service (PSS); Protocols and codecs (Release 9)", 3GPP TS 26.234, v9.2.0, Mar. 2010, pp. 1-176.

Khan et al., "QoE-Driven Adaptation Scheme for Video Applications Over Wireless Networks", IET Communications, vol. 4, Issue: 11, Jul. 23, 2010, pp. 1-21.

"Adaptive HTTP Streaming in PSS", 3GPP TSG-S4 Meeting #56, 84-090999, Change Request, TSG doc SP-090710, Nov. 9-13, 2009, 9 pages.

Huang et al., "Towards Efficient and Accurate QoE Reporting for Emerging Streaming Services", IFIP/IEEE International Symposium on Integrated Network Management-Workshops, Jun. 1-5, 2009, pp. 225-230.

De Vera et al., "QoE Monitoring Platform for Video Delivery Networks", Proceedings of the 7th IEEE International Conference on IP operations and Management, 2007, 12 pages.

Gabin, "3GPP Packet Switch Streaming Quality of Experience", ITU-T Workshop on End-to-End QoE/QoS, Jun. 14-16, 2006, pp. 1-18.

Drogseth, "Quality of Experience: The Ultimate Collaboration—How Real Deployments Are Succeeding and Why", Enterprise Management Associates, Inc., 2008, pp. 1-7.

"IPTV QoS/QoE Metrics", ITU—Telecommunication Standardization Sector, 3rd Focus Group IPTV meeting, Mountain View, CA, USA, Telchemy Incorporated, Jan. 22-26, 2007, pp. 1-4.

Parandehgheibi et al.,"Avoiding Interruptions—QoE Trade-Offs in Block-Coded Streaming Media Applications", IEEE Journal on Selected Areas in Communications, 2011, pp. 1-7.

"N2Nsoft White Paper Series", Network Planning for Quality of Experience, 2007, pp. 10 pages.

Babu et al., "No-Reference Metrics for Video Streaming Applications", 2004, 9 pages.

"Testing Times", Digital TV Europe, Retrieved on Feb. 28, 2013, Retrieved from <URL: http://www.digitaltveurope.net/9353/testing-times/>, May 4, 2010, 10 pages.

European Search Report for Application No. 11795289.5 Dated Apr. 3, 2014.

* cited by examiner

```xml
<?xml version="1.0" encoding="UTF-8"?>
<xs:schema xmlns:xs="http://www.w3.org/2001/XMLSchema" ... >

<xs:element name="receptionReport" type="receptionReportType"/>
<xs:complexType name="receptionReportType">
    :   :   :
    <xs:sequence>
    <xs:complexType name="medialevel_qoeMetricsType">
        <xs:sequence>
            <xs:any namespace="##other" processContents="skip" minOccurs="0" maxOccurs="unbounded"/>
        </xs:sequence>
        <xs:attribute name="sessionId" type="xs:string"/>
        <xs:attribute name="TotalRepresentationSwitchTime" type="xs:doubleVectorType" use="optional"/>
        <xs:attribute name="NumberOfContentSwitchEvents" type="xs:doubleVectorType" use="optional"/>
        <xs:attribute name="BufferingTime" type="xs:doubleVectorType" use="optional"/>
        <xs:attribute name="TotalSleepingDuration" type="xs:doubleVectorType" use="optional"/>
        <xs:attribute name="NumberOfSleepingEvents" type="xs:doubleVectorType" use="optional"/>
        <xs:attribute name="TotalMPDChangeOrInitializationTime" type="xs:doubleVectorType" use="optional"/>
        <xs:attribute name="NumberOfMPDChangeOrInitializationEvents" type="xs:doubleVectorType" use="optional"/>
        <xs:attribute name="MediaTimeVarianceOfEarlySegment" type="xs:doubleVectorType" use="optional"/>
        <xs:attribute name="ThroughputVarianceOfEarlySegment" type="xs:doubleVectorType" use="optional"/>
        <xs:attribute name="NumberOfEarlySegmentEvents" type="xs:doubleVectorType" use="optional"/>
        <xs:attribute name="MediaTimeVarianceOfLateSegment" type="xs:doubleVectorType" use="optional"/>
        <xs:attribute name="ThroughputVarianceOfLateSegment" type="xs:doubleVectorType" use="optional"/>
        <xs:attribute name="NumberOfEarlySegmentEvents" type="xs:doubleVectorType" use="optional"/>
        <xs:attribute name="ThroughputVarianceOfLateSegment" type="xs:doubleType" use="optional"/>
        <xs:attribute name="AbandonedMediaDuration" type="xs:doubleType" use="optional"/>
        <xs:attribute name="PlaybackStartingTime" type="xs:doubleType" use="optional"/>
        <xs:attribute name="Representation-X-Duration" type="xs:doubleVectorType" use="optional"/>
        <xs:attribute name="BitrateJitterDuration" type="xs:doubleVectorType" use="optional"/>
        <xs:attribute name="NumberOfBitrateJitterEvents" type="xs:doubleVectorType" use="optional"/>
        <xs:attribute name="rebufferingDuration" type="xs:double" use="optional"/>
        <xs:attribute name="InitialBufferingDuration" type="xs:double" use="optional"/>
        <xs:anyAttribute processContents="skip"/>
    </xs:complexType>
    </xs:sequence>
    <xs:attribute name="sessionID" type="xs:string" use="required"/>
</xs:complexType>
</xs:schema>
```

FIG. 10

METHOD AND APPARATUS FOR GENERATING AND HANDLING STREAMING MEDIA QUALITY-OF-EXPERIENCE METRICS

RELATED APPLICATION

This application claims priority to U.S. Application No. 61/356,411 filed Jun. 18, 2010, which is incorporated herein by reference in its entirety.

TECHNICAL FIELD

Embodiments of the present invention relate generally to communications technology, and, more particularly, relate to systems, methods, and apparatuses for generating and handling streaming media quality-of-experience metrics.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. Current and future networking technologies, as well as evolved computing devices making use of networking technologies, continue to facilitate ease of information transfer and convenience to users. In this regard, the expansion of networks and evolution of networked computing devices has provided sufficient processing power, storage space, and network bandwidth to enable the transfer and playback of increasingly complex media files. Accordingly, functionality such as Internet television, video and audio sharing, and the like are gaining widespread popularity.

SUMMARY OF SOME EXAMPLES

Example systems, methods, and apparatuses are described herein that provide for the generating and handling of streaming media quality-of-experience metrics. One example method includes receiving by a processing device, e.g., client device, media presentation data, wherein the media presentation data is associated with a presentation of streaming media, and determining one or more quality of experience metrics that are to be reported. For example, the quality of experience metrics are determined based on a trigger/request by another entity, e.g., a request by a server, the media presentation data, a pre-configuration in the client device, and/or the like. The example method further comprises generating a metric value corresponding to each of the one or more quality of experience metrics, and causing the metric value corresponding to each of the one or more quality of experience metrics to be reported. According to various example embodiments, the at least one generated and reported metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

An additional example embodiment is an apparatus comprising at least one processor and at least one memory including computer program code, the at least one memory and the computer program code configured to, with the at least one processor, cause the apparatus to perform various functionalities. In this regard, the example apparatus may be caused to receive media presentation data, where the media presentation data is associated with a presentation of streaming media, and determine one or more quality of experience metrics that are to be reported. For example, the quality of experience metrics are determined based on a trigger/request by another entity, e.g., a request by a server, the media presentation data, a pre-configuration in the client device, and/or the like. The example apparatus may be further caused to generate a metric value corresponding to each of the one or more quality of experience metrics, and cause the metric value corresponding to each of the one or more quality of experience metrics to be reported. According to various example embodiments, the at least one generated and reported metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

Another example embodiment is a computer program product comprising a tangible memory having computer program code stored thereon, wherein the computer program code, when executed by a processor, is configured to cause an apparatus to perform various functionalities. In this regard, the program code may be configured to cause an apparatus to receive media presentation data, where the media presentation data is associated with a presentation of streaming media, and determine one or more quality of experience metrics that are to be reported. For example, the quality of experience metrics are determined based on a trigger/request by another entity, e.g., a request by a server, the media presentation data, a pre-configuration in the client device, and/or the like. The computer program code is further configured, when executed, to cause the apparatus to generate a metric value corresponding to each of the one or more quality of experience metrics, and report the metric value corresponding to each of the one or more quality of experience metrics. According to various example embodiments, the at least one generated and reported metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

Another example apparatus includes means for receiving media presentation data, where the media presentation data is associated with a presentation of streaming media, and means for determining one or more quality of experience metrics that are to be reported. For example, the quality of experience metrics are determined based on a trigger/request by another entity, e.g., a request by a server, the media presentation data, a pre-configuration in the client device, and/or the like. The example apparatus further comprises means for generating a metric value corresponding to each of the one or more quality of experience metrics, and means for causing the metric value corresponding to each of the one or more quality of experience metrics to be reported. According to various example embodiments, the at least one generated and reported metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

BRIEF DESCRIPTION OF THE DRAWING(S)

Having thus described some example embodiments of the invention in general terms, reference will now be made to the accompanying drawings, which are not necessarily drawn to scale, and wherein:

FIG. 10 provides example syntax for a quality of experience report according to an example embodiment of the present invention.

DETAILED DESCRIPTION

Figure 1:
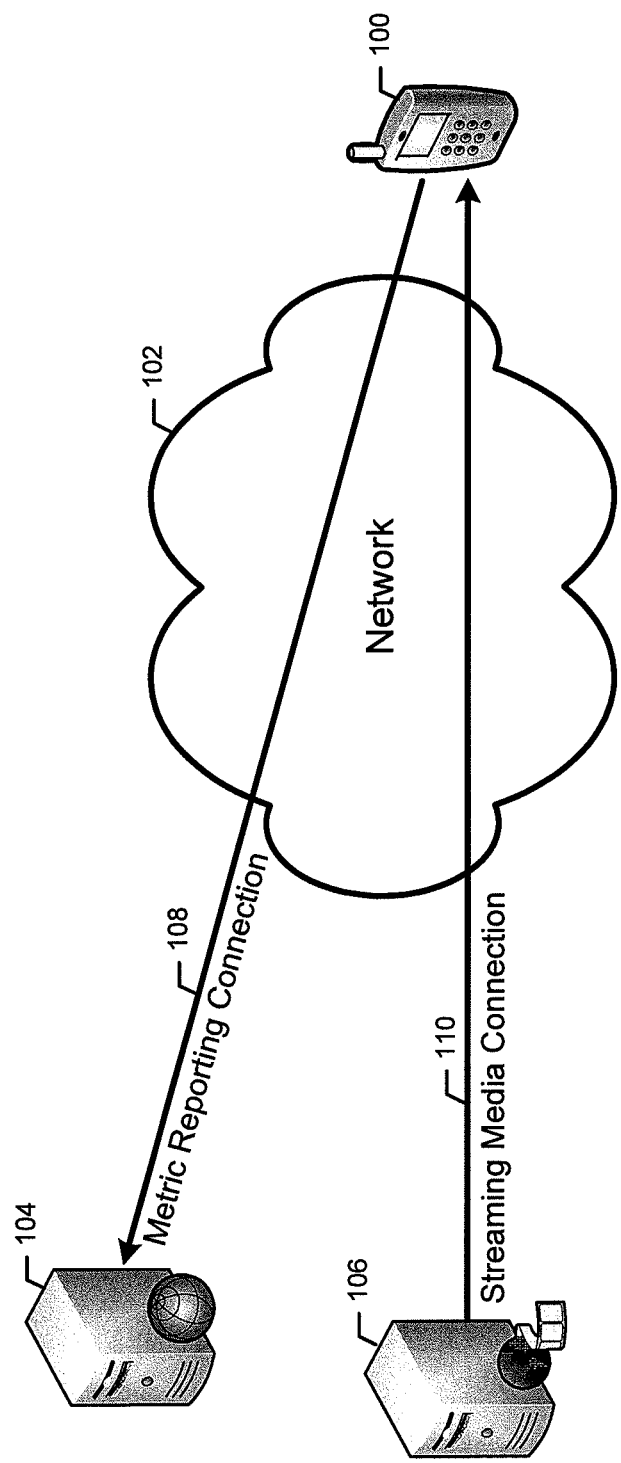
FIG. 1 illustrates a system that support quality of experience metric generation and handling according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

According to some example embodiments of the present invention, methods and apparatuses are described that provide for the generation and reporting of quality of experience (QoE) metrics. The QoE metrics may be measured or calculated values indicative of the quality of experience, related to an HTTP or an adaptive HTTP streaming media session, from the perspective of a receiving client device. During or after presentation of streaming media, in accordance with a periodic QoE reporting interval, a client device, which may be currently presenting the streaming media to user or have previously presented streaming media to a user, may be configured to generate one or more values for various QoE metrics and report the values to a QoE metric collecting server for storage at the QoE metric collecting server. In an example embodiment, the QoE metric collecting server is configured to access and analyze the stored QoE metrics and modify one or more attributes associated with streaming media, for example, improve the user experience and future quality of experience. In another example embodiment, another entity, e.g., streaming server and/or a network entity, is configured to access the QoE metrics stored in the QoE metric collecting server, analyze the QoE metrics and adjust/modify one or more of the attributes associated with the streaming media. According to some example embodiments, network communications-based metrics may also be provided and considered in conjunction with the QoE metrics for adjusting/modifying attribute(s) associated with the streaming media.

Within the context of HTTP streaming or adaptive HTTP streaming, packet loss in the media stream can often be handled through the use of transmission control protocol (TCP), which provides a reliable delivery mechanism. Packet loss can be a more significant when protocols other than an HTTP streaming protocol is used, such as a real-time transport protocol (RTP)/user datagram protocol (UDP). However, HTTP and adaptive HTTP streaming can suffer from delay jitter, which is often due to re-transmission delays associated with TCP. According to various example embodiments provided herein, a number of QoE metrics are defined that may be used in conjunction with media streaming, such as HTTP media streaming and/or adaptive HTTP media streaming, to improve user experience. For example, user experience may be improved by adjusting the service offering to include content encodings at more optimized bitrates, reducing buffering time, supporting quick representations changes, improving playback media quality, saving network bandwidth, and/or improving other issues associated with media streaming. According to some example embodiments, the QoE metrics as described herein may be implemented in accordance with HTTP streaming and/or adaptive HTTP streaming. In this regard, an example of adaptive HTTP streaming is specified in $3^{rd}$ Generation Partnership Project (3GPP) packet-switched streaming service (PSS) release 9, which supports multimedia streaming over HTTP protocol.

In order to stream media to a client device, a media presentation may be provided to the device. A media presentation or media presentation data may be a structured collection of data including a sequence of periods and an associated media presentation description (MPD). Each period may include one or more representations of similar media content. Representations may differ with respect to bitrates, video or audio resolutions, languages, or the like. Each representation may include one or more segments. A segment may include media data or metadata to decode and present the included media content. The MDP includes metadata that is usually used by a client device to access the segments needed to provide streaming media to a user. The MPD, for example, provides metadata for use in constructing a request, e.g., a GET request, for media segments containing media data. The MPD provides metadata regarding the number of representations as well as the characteristics of each representation. Furthermore, initialization information is included in each representation as metadata for accessing the media samples of each segment. The MPD may provide unique uniform resource locators (URLs) or uniform resource identifiers (URIs) that may be used to locate and download each media segment for presentation. In streaming media segments, sequential requests and associated responses providing segments are usually performed. Accordingly, the MPD is pre-defined and sent to the client device as metadata to facilitate the construction of the requests for the segments.

Media presentations may be conducted in a static content preparation mode or a dynamic content preparation mode. In the static mode, the MPD and representations are pre-defined, before starting the streaming session. In the static mode, a server may provide the media files similar to the manner in which any other static media file would be provided. In the dynamic mode, the server may create the media data compliant with a data format of the streaming protocol, e.g., adaptive HTTP streaming in 3GGP PSS, in response to a request, e.g., HTTP GET request. The segment durations may be dynamically set within the requests.

The client device may transmit a series of requests, each of which requesting a media segment of a representation as specified by the MPD. In adaptive HTTP streaming, the client may perform and oversee rate adaptation by identifying the representation which includes media segments encoded at, or as close as possible to, the target bitrate encoded segments. The client device may operate differently, depending on whether a static or dynamic mode is being implemented. In the static mode, the client device may determine the rate for the media, and consecutively request media segments from the corresponding representation. In the dynamic mode, the client device can request media segments from different representations, and determine the duration of each segment by setting the start time and duration in a request.

In view of the foregoing, some example embodiments implement a QoE reporting mechanism for use with, for example, adaptive HTTP streaming of 3GPP PSS. In the static mode, according to various example embodiments, the QoE metrics may be analyzed, by a network entity and/or a service provider entity, and used to optimize the creation of the MPD and appropriate representations for future streaming media sessions involving the same, or similar, content. In the dynamic mode, the QoE metrics may also be used to optimize the creation of the MPD. However, since the media segments of the representations may be created on demand via a request, the QoE metrics may be used to create guidelines and associated signaling from the server to the client device to optimize future media segment requests. According to various example embodiments, the use of QoE reporting mechanisms may assist service providers to offer content in a way that minimizes buffer underflow and overflow, reduces the time to switch between different representations, and improves overall quality of the multimedia experience.

FIG. 1 illustrates a system that supports streaming media and the generation and reporting of QoE metrics associated with streaming media. The system of FIG. 1 includes a client device 100, a network 102, a QoE metric collecting server 104, and a web server 106. The client device 100 may be any type of wired or wireless device that is configured to receive and present streaming media. The client device 100 may be a mobile terminal (e.g., a mobile phone), a stationary terminal (e.g., a personal computer), or the like. The network 102 may any type of wired network, wireless network, or a combination thereof. The network 102 may include the Internet.

Via the network 102 and streaming media connection 110, the client device 100 may request and receive media presentation data from the web server 106 to be presented on a user interface of the client device 100. The web server 106 may be an HTTP web server and the streaming media connection 110 may support HTTP streaming over TCP. In some example embodiments, the streaming media connection 110 may be realized in accordance with adaptive HTTP streaming in 3GPP PSS. As such, in some example embodiments, the web server 106 can be configured to create a media presentation in accordance with adaptive HTTP streaming.

During or after presentation of the media stream by the client device 100, based on a QoE reporting interval, the client device may generate and report QoE metrics relating to streamed media to the QoE metric collecting server 104 via a metric reporting connection 106. According to some example embodiments, QoE metrics may be provided in accordance with a periodic or irregular QoE reporting interval. The client device 100 may be configured to analyze the content of the MPD to determine which QoE metrics to generate and report.

Triggering QoE reporting in a PSS may be performed using, for example, OMA (Open Mobile Alliance) Device Management, using a real-time streaming protocol (RTSP) header field (e.g., referred to as "3GPP-QoE-Metrics"). Alternatively, triggering may be performed separately for each media stream using a session description protocol (SDP) attribute (e.g., referred to as "3GPP-QoE-Metrics"). As another alternative, the triggering of QoE reporting may be accomplished by either using HTTP or using an RTSP header field (e.g., referred to as "3GPP-QoE-Feedback"). Further, the initiation or triggering of QoE reporting may be performed via the MPD. In this regard, the definition of the syntax and semantics for QoE metrics and elements may be defined in the MPD. The QoE parameters within the MPD may include the address of the reporting server as well as the desired QoE metrics, if QoE reporting is requested. According to some example embodiments, QoE reporting may use HTTP and the PSS extensible markup language (XML) reporting format.

According to some example embodiments, the QoE metrics may be provided to the QoE metric collecting server 104 in the form of a QoE report. The QoE report may include information in addition to metric values associated with the generated QoE metrics. In this regard, according to some example embodiments, the QoE report may include the URL of the MPD, the current period of the media presentation (e.g., at the time of the reporting), and the current representation of the media presentation that is being provided. Additionally, the QoE report may include the current time position in the media presentation. For live presentations, the current time position may be provided in accordance with coordinated universal time (UTC). For on-demand presentations, the current time position may be provided as the time since the beginning of the media presentation content. Based on some or all of this information, the QoE metric collection server 104 may be able to determine information about media codecs, bitrates, and the like.

The QoE metric collecting server 104 may be configured to compile and store the QoE metrics with respect to a media presentation. The QoE metric collecting server 104 may be configured to analyze the QoE metrics and adjust parameters associated with a media presentation accordingly as further described below. In some example embodiments, the QoE metric collecting server 104 may provide access to the stored QoE metrics to another entity (e.g., the web server 106) that may be configured to analyze the QoE metrics and adjust parameters associated with a media presentation. In some example embodiments, the QoE metric collecting server 104 and the web server 106 may be same device.

Figure 2:
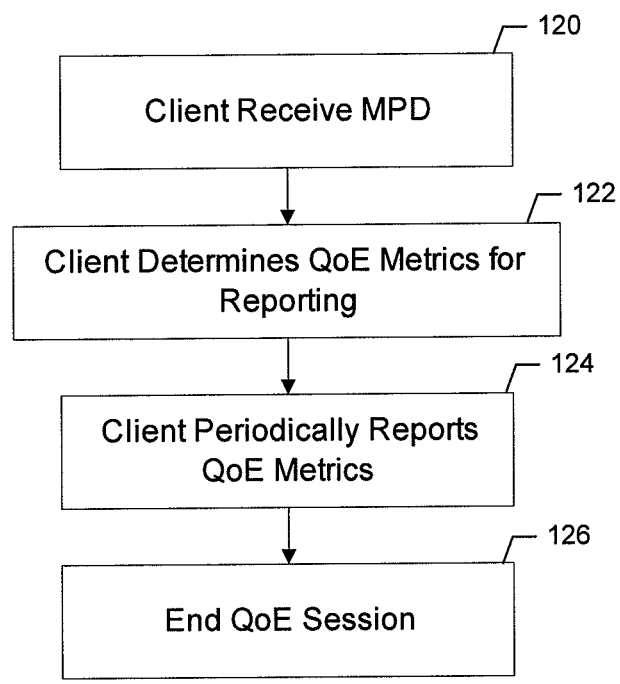
FIG. 2 illustrates a flowchart of an example method for performing quality of experience metric generation and reporting according to an example embodiment of the present invention.

FIG. 2 illustrates a method that the client device 100 may be configured to perform to report QoE metrics. At 120, the client device receives an MPD from, for example, a web server that is, or will be, streaming media content to the client device. At 122, the client device may analyze the MPD to determine which of a plurality of QoE metrics will be generated for subsequent reporting. At 124, the client device reports each of the generated QoE metrics to a sever, such as, for example, a QoE metric collecting server. The QoE metrics may be included in a QoE report that is provided in accordance with a QoE reporting interval. The QoE session may end at 126.

Having described example procedures and contexts for use with QoE metrics, the following provides descriptions of a number of QoE metrics that can be generated, reported, received, stored, and analyzed in accordance with various example embodiments of the present invention. According to various example embodiments, the following QoE metrics and other QoE metrics may be generated and provided in a QoE report and reported in accordance with a QoE reporting interval. FIG. 10 provides example XML syntax for a QoE report that may, according to some example embodiments, be used with adaptive HTTP streaming for 3GPP PSS. According to various example embodiments, the QoE metrics described below may also be used with adaptive HTTP streaming of 3GPP PSS.

A re-buffering event metric may be defined. The metric name may be "Rebuffering_Event". The re-buffering event metric may indicate that a re-buffering event has occurred after a buffer underflow was experienced. The metric value may indicate the time position in the media presentation at which a re-buffering event occurred. In this regard, the re-buffering event metric may denote the occurrence of a playback interruption and re-buffing due to under flow of the client device's buffer. A large number of re-buffering events reported from one or multiple clients may indicate that the provided bitrate in MPD may exceed the available end-to-end bandwidth bottleneck. In this case, the QoE metric collecting server may be configured to inform the web server, which may be an HTTP streaming server, or a media content provider to provide lower bitrate encoded multimedia data for streaming.

A buffering time metric may be defined. The metric name may be "Buffering_Time". The buffering time metric may be used to indicate the duration of the previous buffering period. The value of the buffering time metric may be determined as the time needed to reach a threshold or a signaled minimum buffering time. In other words, the buffering time metric may provide information regarding the time used to fill the client device's buffer to reach a threshold or minimum buffering time. A large metric value for the buffering time metric may indicate that the web server should decrease the client buffer filling time by providing a lower bitrate encoded multimedia, by providing advanced progressively enhancing bitrates of media data, or by changing the associated TCP parameter setting. Additionally or alternatively, some or all buffering times at the instances when a representation switch occurs may be stored in a vector and reported. The buffering time metric may be used in the application of rate adaption of adaptive HTTP streaming and the creating an adaptive HTTP streaming media file. Further, the buffering time metric may be used to evaluate the buffering time changes between two consecutive representations. This information may give guidance to evaluate and improve the rate adaptation algorithm and indicate to the web server or media content provider that one or more alternative representations with fine scalability of bitrates should be created or that the segment duration should be reset. A variety of additional applications for this metric are also possible.

A buffered media time metric may be defined. The metric name may be "Buffered_Media_Time". The buffered media time metric may be determined or calculated at the end of a QoE reporting interval and may indicate the media duration of the currently buffered (not-yet played) media data at the client device. This metric may be used with HTTP streaming or adaptive HTTP streaming to set the buffer overflow limit so that bandwidth waste can be minimized or eliminated. Moreover, this metric may provide average information regarding the delay jitter. When the buffered media time metric value indicates a high deviation from the minimum buffering time, this metric may guide the web server or content provider to optimize the streaming system, for example, by optimizing segment duration in a request (e.g., a HTTP GET request), so that the buffered media time converges to the target buffering time to decrease the possibility of client buffer underflow.

A representation switch event metric may be defined. The representation switch event metric may indicate the client's decision to perform a representation switch. The metric value may indicate the time position at which the client initiated the representation switch.

A representation switch duration metric may also be defined. The metric name may be "Representation_Switch_Duration". The representation switch duration metric may indicate the time that elapses from deciding to perform a representation switch or initiating a representation switch until the playback of the first sample from the new representation. The representation switch event metric and the representation switch duration metric may be used together to evaluate how quickly a representation switch can be achieved. If the representation switch duration is too large then, for example, the QoE metric collecting server may guide web server or content provider to optimize, for example, the HTTP streaming system by optimizing the TCP implementation or TCP parameters settings, or by optimizing segment duration in each request (e.g., HTTP GET request).

In some example embodiments, a related metric in the form of a representation switch time metric may additionally or alternatively be provided. The representation switch time may be used to report the time that elapses from initiation of the representation switch by the user to playback of the first sample of the new representation. In this regard, according to some example embodiments, some or all the representation switch times may be summed over each QoE reporting interval and stored in a vector, e.g., entitled TotalRrepresentationSwitchTime. The number of individual events over the QoE reporting interval may be summed and stored in the vector NumberOfRepresentationSwitchEvents. These two vectors may then be reported by the client device as metric names "TotalRepresentationSwitchTime" and "NumberOfContentSwitchEvents", respectively. This metric may be used in the application of rate adaption of Adaptive HTTP streaming and for creating an adaptive HTTP streaming media file. In the application of rate adaptation algorithm, a high value of NumberOfContentSwitchEvents and TotalRepresentationSwitchTime may indicate the rate adaptation algorithm is experiencing difficulty converging to a stable bitrate level. As such, this information may indicate that the rate adaptation algorithm may need to be modified or improved. In the application of creating streaming content, this information may also provide guidance with respect to how content should be created by providing alternative representations with a fine scale. Additionally, or alternatively this information may indicate that a random access point should be inserted within a media segment or the segment duration should be reset. A variety of additional applications for this metric are also possible.

An average segment fetch time metric may also be defined. The metric name may be "Average_Segment_Fetch_Time". The average segment fetch time may indicate the average media segment fetch time as a percentage of the media segment duration for the QoE reporting interval. For example, for media segments of 10 seconds and an average fetch time of 8 seconds, the reported metric value is 80%. As such, the average segment fetch time provides ratio information between encoded media bitrates and the average TCP throughput. If the value for the average segment fetch time metric is, for example, too small, the QoE metric collecting server may guide the web server or a content provider to provide higher bitrate encoded multimedia to client devices.

A related metric, that may be additionally or alternatively used, is a media time variance of early segment metric. In this regard, if the time difference between media duration of a segment and the fetch duration of the segment is larger than a predefined threshold, then the segment is denoted as early segment. The segment fetch duration can indicate the time from the sending of a request (e.g., GET request) of a segment to the time that the last bit of the segment is received. The media time variance of early segment metric may indicate the time difference between the media duration of a segment and the segment fetch duration. In addition, the total number of early segment events may also be reported as a metric. According to some example embodiments, for the media time variance of early segment metric, some or all of the media variances of early segments may be summed over each QoE reporting period and stored in a vector, e.g., MediaTimeVarianceOfEarlySegment. The number of individual events over the QoE reporting interval may also be summed and stored in another vector, e.g., NumberOfEarlySegmentEvents. These two vectors may then be reported by the client device as "MediaTimeVarianceOfEarlySegment" and "NumberOfEarlySegmentEvents".

The media time variance of early segment metric may be used in the application of rate adaption of Adaptive HTTP streaming and the creation of an adaptive HTTP streaming media file. In the rate adaption application, this metric may be used for evaluating the efficiency of the rate adaptation. A large value for MediaTimeVarianceOfEarlySegment and NumberOfEarlySegmentEvents may denote that the network bandwidth is capable of servicing higher bitrate of media streaming. In an application of creating a media file, a large value of MediaTimeVarianceOfEarlySegment and NumberOfEarlySegmentEvents may indicate that the network bandwidth may be capable of providing higher bitrate for media streaming. As such, this metric may provide guidance to the web server or media content provider for creating one or more alternative representations. In another application for creating a media file, the large value of both NumberOfEarlySegmentEvents and NumberOfLateSegmentEvents (as further described below) may denote the variation for fetching each segment, which results in the variation of the buffering time in the client buffer. This information may provide guidance to set the segment duration so that the segment fetch time moves towards the media time of the segment. A variety of additional applications for this metric are also possible.

Another metric related to the average segment fetch time metric, that may be additionally or alternatively used, is the throughput variance of early segment metric. The throughput variance of early segment metric may indicate the average throughput variance of an early segment from the average bitrate of the representation. In this regard, some or all the throughput variances of early segments may be summed over each QoE reporting interval and stored in a vector, e.g., ThroughputVarianceOfEarlySegment. The number of individual events over the QoE reporting interval may also be summed and stored in a vector, e.g., NumberOfEarlySegmentEvents. These two vectors may then be reported by the client device as "ThroughputVarianceOfEarlySegment" and "NumberOfEarlySegmentEvents".

This metric may also be used in the application of rate adaption of Adaptive HTTP streaming and the creating of an adaptive HTTP streaming media file. In the rate adaption application, the throughput variance of early segment metric may be used for evaluating the efficiency of the rate adaptation. A large value for ThroughputVarianceOfEarlySegment and NumberOfEarlySegmentEvents may indicate that the network bandwidth is capable of servicing a higher bitrate of media streaming. This information may provide further guidance to improve the bitrate adaption algorithm or indicate to the web server or content provider that a higher bitrate representation should be provided. In an application for creating a media file, a large value for ThroughputVarianceOfEarlySegment and NumberOfEarlySegmentEvents may denote that the network bandwidth may be capable of supporting a higher bitrate for media streaming. As such, this metric may provide guidance to the web server or media content provider for creating one or more alternative representations. In another application of creating media file, a large value of both NumberOfEarlySegmentEvents and NumberOfLateSegmentEvents (as further described below) denotes a variation for fetching each segment which results in the variation of the buffering time in the client buffer. This information may provide guidance to set the segment duration so that the segment fetch time moves towards the media time of the segment. A variety of additional applications for this metric are also possible.

Another metric related to the average segment fetch time metric, that may be additionally or alternatively used, is the media time variance of late segment metric. In this regard, if the time difference between the fetch duration of a segment and media duration of the same segment is larger than a predefined threshold, then the segment may be denoted as a late segment. The media time variance of late segment metric indicates the time difference between segment fetch duration and the media duration of the segment. In addition, the total number of late segment events may be reported. According to some example embodiments, for the media time variance of late segment metric, some or all the media time variances of late segments may be summed over each QoE reporting interval and stored in a vector, e.g., MediaTimeVarianceOfLateSegment. The number of individual events over the QoE reporting interval may be summed and stored in the NumberOfLateSegmentEvents. These two vectors may then be reported by the client device as "MediaTimeVarianceOfLateSegment" and "NumberOfLateSegmentEvents".

This metric may be used in the application of rate adaption of Adaptive HTTP streaming and the creating of an adaptive HTTP streaming media file. In the rate adaption application, media time variance of late segment metric may be used for evaluating the efficiency of the rate adaptation. A large value of MediaTimeVarianceOfLateSegment and NumberOfLateSegmentEvents may indicate that the network bandwidth is incapable of servicing media streaming. This information may provide further guidance to improve the bitrate adaption algorithm, or provide guidance to the web server or content provider that lower bitrate representations should be provided. In an application for creating a media file, a large value for MediaTimeVarianceOfLateSegment and NumberOfLateSegmentEvents may indicate that the network is incapable of providing media streaming service with the provided representation. As such, this metric may provide guidance to the web server or a content provider to create one or more alternative representations. In another application for creating a media file, a large value of both NumberOfLateSegmentEvents and NumberOfEarlySegmentEvents denotes the variation for fetching each segment, which results in the variation of the buffering time in the client buffer. This information may provide guidance to set the segment duration so that the segment fetch time move towards the media time of the segment. A variety of additional applications for this metric are also possible.

Yet another metric related to the average segment fetch time metric, that may be additionally or alternatively used, is the throughput variance of late segment metric. The throughput variance of late segment metric indicates the average throughput variance of a late segment from the average bitrate of the representation. In addition, the total number of late segment events may be reported. According to some example embodiments, for the media time variance of late segment metric, some or all the throughput variances of late segments may be summed over each QoE reporting period and stored in a vector, e.g., ThroughputVarianceOfLateSegment. The number of individual events over the QoE reporting period may be summed and stored in the a vector, e.g., NumberOfLateSegmentEvents. These two vectors may then be reported by the client device as "ThroughputVarianceOfLateSegment" and "NumberOfLateSegmentEvents".

This metric may be used in the application of rate adaption of Adaptive HTTP streaming and the creating of an adaptive HTTP streaming media file. In the rate adaption application, the throughput variance of late segment metric may be used for evaluating the efficiency of the rate adaptation. A large value for ThroughputVarianceOfLateSegment and NumberOfLateSegmentEvents may indicate that the network bandwidth is incapable of servicing media streaming. This information may provide further guidance to improve the bitrate adaption algorithm or provide guidance to the web server or content provider to provide a lower bitrate representation. In an application for creating a media file, a large value of ThroughputVarianceOfLateSegment and NumberOfLateSegmentEvents may indicate that the network is incapable of providing media streaming service with the provided representation. As such, this metric may provide guidance to the web server or media content provider for creating one or more alternative representations. In another application for creating a media file, a large value for both NumberOfLateSegmentEvents and NumberOfEarlySegmentEvents denotes the variation for fetching each segment, which results in the variation of the buffering time in the client buffer. This information may provide guidance to set the segment duration so that the segment fetch time moves towards the media time of the said segment. A variety of additional applications for this metric are also possible.

An average inactivity time per segment metric may also be defined. The metric name may be "Average_Inactibity_Time". The average inactivity time per segment metric may report the average time between the reception of the last byte of the previous media segment and the time of transmission of the request (e.g., HTTP GET request) for the current segment. Note that when request pipelining is used, this value may be negative. The average inactivity time per segment may provide information about how efficiently the network resources are being used. A large value of this metric may indicate that network capacities are higher than the encoded bitrates. As such, the web server or content provider may serve the client with higher bitrate encoded multimedia streaming.

A related metric that may additionally or alternatively be used is the sleeping duration metric. This metric indicates the duration of time from the instance of getting the last bit from the previous segment to the instance of sending the request for the next segment. A large duration indicates that the client may be operating at a bitrate lower than that which is available. According to some example embodiments, some or all sleeping durations may be summed over each QoE reporting interval and stored in a vector, e.g., TotalSleepingDuration. The number of individual events over the QoE reporting interval may be summed and stored in a vector, e.g., NumberOfSleepingEvents. These two vectors may then be reported by the client as "TotalSleepingDuration" and "NumberOfSleepingEvents". A large value of these metrics denotes that the network capacity is capable of serving higher bitrate encoded media streaming. As such, this metric may provide guidance to the web server or media content provider to create one or more alternative representations, or reset the segment duration. A variety of additional applications for this metric are also possible.

A representation playback time metric may also be defined. The metric name may be "Representation_Playback_Time". This metric may report the sum of media time played from a specific representation since the beginning of the period. The representation playback time may be used to evaluate which representations are desirable with respect to content, network capacity, hardware capacity, and the like. Such information may guide the web server or content provider to create representations of multimedia.

A related metric that may additionally or alternatively be used is the representation-x duration metric. This metric may be used to report the playback time period of each representation during playback of the same content in a session. According to some example embodiments, some or all of the durations of the representations may be summed over each QoE reporting interval and stored in a vector, e.g., "Representation-X-Duration". The "X" may indicate the identity of each of the received representations. This vector may then reported by the client device as "Representation-X-Duration". This metric may be used in the application of rate adaption of Adaptive HTTP streaming and the creating of an adaptive HTTP streaming media file. If the Representation-n-Duration and Representation-n+1-Duration take a large part of the entire playback duration, then the metric may provide guidance to improve the adaptive HTTP streaming with respect to convergence to a stable bitrate level or to give alternative representations with a fine scale. A variety of additional applications for this metric are also possible.

A media segment not accessible metric may also be defined. The metric name is "Media_Segment_Unaccessible". This metric may report an error event, when the client device is unable to fetch a specific media segment. The media segment not accessible metric can be used to detect errors.

An MPD change or initialization time metric may also be defined. This metric may indicate the time that elapses from the initiation of a media presentation description change, or an initiation of a media presentation description request (e.g., a media presentation description GET request) for a first time by a user, to the receipt the last bit of media presentation description. According to some example embodiments, some or all MPD change or initialization times may be summed over each QoE reporting interval and stored in a vector, e.g., TotalMPDChangeOrInitializationTime. The number of individual events over the QoE reporting interval may be summed and stored in a vector NumberOfMPDChangeOrInitializationEvents. If the MPD is unchanged from the previous MPD for a measurement QoE reporting interval and no MPD initialization occurs, an "=" may be used to indicate this situation. These two vectors may then be reported by the client device as "TotalMPDChangeOrInitializationTime" and "NumberOfMPDChangeOrInitializationEvents". This metric may be used for evaluating whether the MPD change affects the quality of streaming, such as adaptive HTTP streaming. This information can further provide guidance to the web server or media content provider to create the MPD. A variety of additional applications for this metric are also possible.

An abandoned media durations metric may also be defined. This metric may indicate the abandoned duration of media which is received by the client and stored in the client buffer but not played back. The abandoned media duration metric may be stored in a double variable, e.g., AbandonedMediaDuration. This variable may be reported by the client device as "AbandonedMediaDuration". This metric may be used to evaluate the efficiency of network usage. A large value of this metric may indicate that a large amount of media data is being transmitted through the network and being received by the client, but the media samples have not been played back due to the user leaving the session. This information may guide the setting of the maximum buffering time in the client buffer which may be signaled from the web server to the client device or the QoE metric collecting server. Further, this information may be used in the rate adaptation algorithm to set the sleeping time between two consecutive segment requests (e.g., GET segment requests) when the buffering time is larger than the maximum buffering time. A variety of additional applications for this metric are also possible.

A playback starting time metric may be defined. This metric may indicate the time that elapses from the initiation of the first request of a session to playback the first sample of a representation. The playback starting times may be summed over each QoE reporting interval and represented by a double variable, e.g., PlaybackStartingTime. This variable may be reported by the client device as "PlaybackStartingTime". This metric may be used to evaluate the streaming experience of the user. A large difference between playback starting time and initial buffering time may provide guidance to decrease the playback start time by changing the TCP parameter setting, resetting segment duration, improving rate adaption algorithm, or providing lower bitrate representations. A variety of additional applications for this metric are also possible.

A bitrate jitter duration metric may be defined. A value of the bitrate jitter duration metric may indicate a duration of time starting from the time when the difference between the average bitrate over a certain period and the bitrate of the current representation is bigger than a predefined threshold. The duration may end when the difference between the average bitrate over a certain period and the bitrate of the current representation is smaller than a pre-defined threshold. The bitrate jitter duration can indicate the time duration of bitrate jitter. According to some example embodiments, jitter can occur more than once during a QoE reporting interval. In that case, the metric value can occur more than once indicating the number of bitrate jitter events. According to some example embodiments, some or all bitrate jitter durations may summed over each QoE reporting interval and stored in a double vector, e.g., BitrateJitterDuration. The number of individual events over the QoE reporting interval may be summed up and stored in another vector, e.g., NumberOfBitrateJitterEvents. These two vectors may then be reported by the client device as "BitrateJitterDuration" and "NumberOfBitrateJitterEvents."

A throughput variance in a representation metric may also be defined. This metric may be used to report the average variance between a defined duration of throughput from the average bitrate of the current representation, where the duration may be a fixed time period, such as a default segment duration or a fragment duration.

Additionally, network and communications metrics may be defined and, in some example embodiments, included in a QoE report. For example, a network connection bandwidth metric may be defined for the current representation together with the buffering time metric, and the average segment fetch time metric to evaluate the efficiency of the streaming (e.g., HTTP streaming). The metric name may be "Network_Connection_Bandwidth". The network connection bandwidth metric may indicate the bandwidth of the network which is connected to the client device, e.g., bandwidth of ADSL (asymmetric digital subscriber line), HSDPA (high-speed downlink packet access), WCDMA (wideband code division multiple access, and the like. If the network connection bandwidth metric value is much larger than the bitrates of the encoded media data in the current representation, the QoE metric collecting server may improve the streaming, e.g., HTTP streaming or adaptive HTTP streaming, system by improving the TCP implementation and the TCP parameters, and utilizing a TCP throughput calculation equation.

Figure 3:
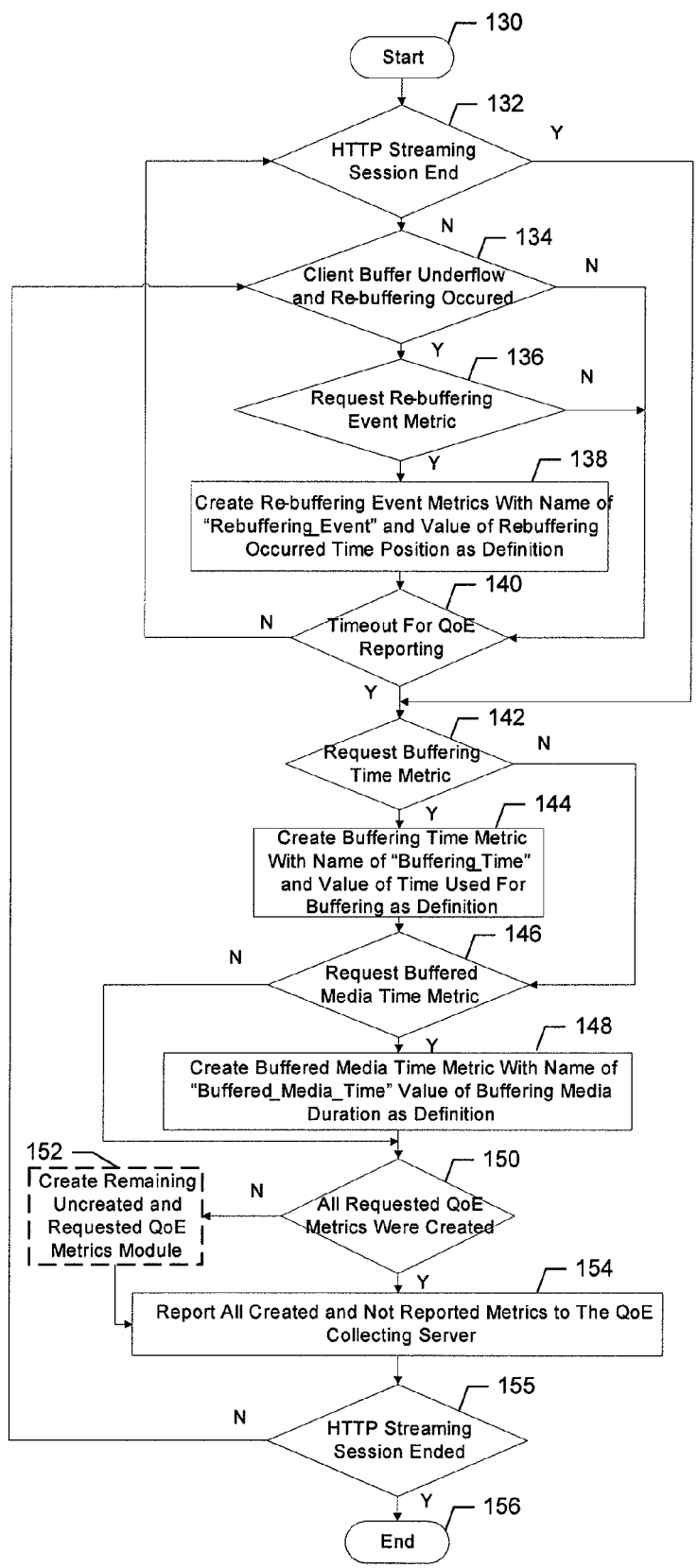
FIG. 3 illustrates a flowchart of an example method for performing quality of experience metric generation and reporting with respect to a re-buffering event metric, a buffering time metric, and a buffered media time metric according to an example embodiment of the present invention.
Figure 4:
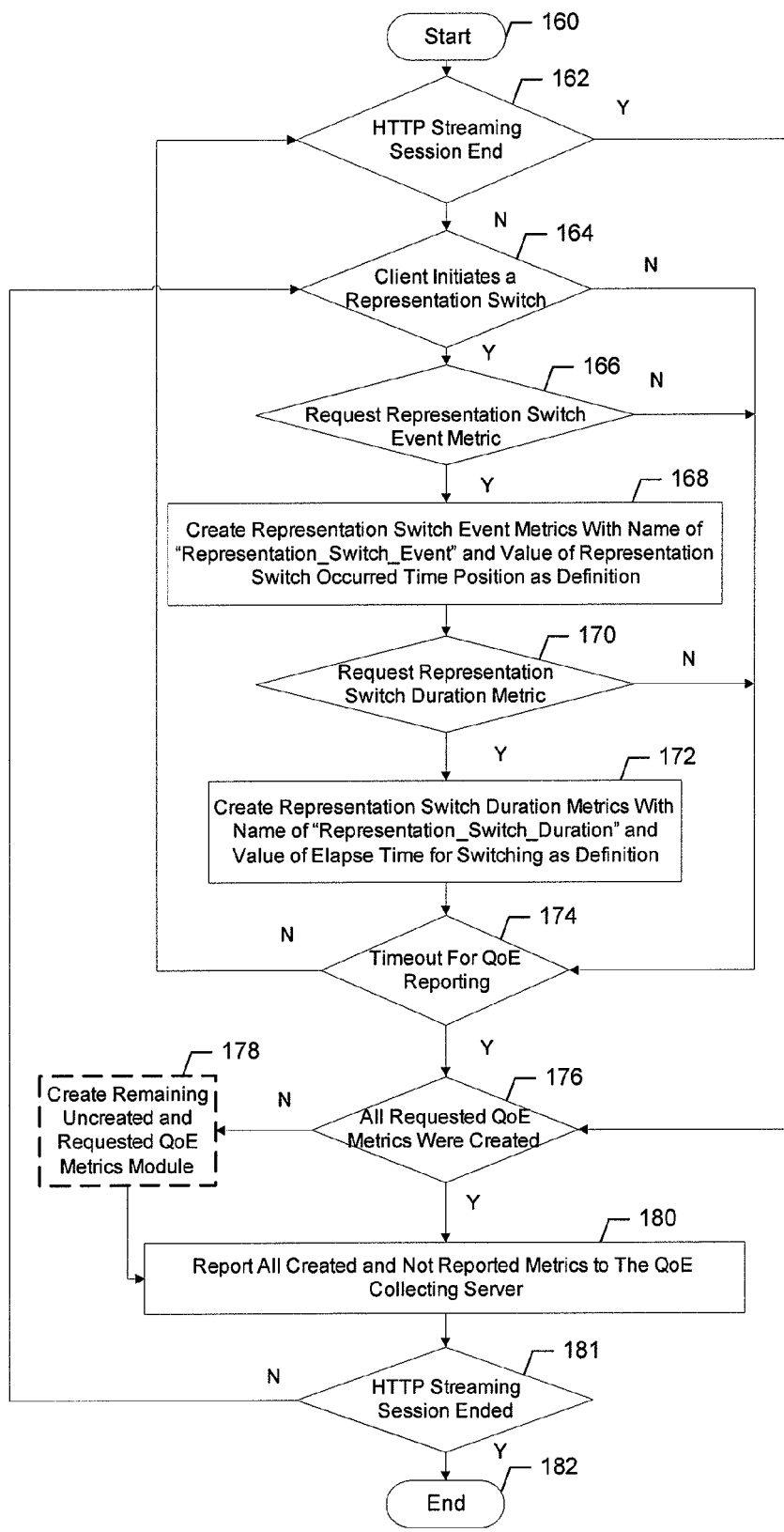
FIG. 4 illustrates a flowchart of an example method for performing quality of experience metric generation and reporting with respect to a representation switch event metric and a representation switch duration metric according to an example embodiment of the present invention.
Figure 5:
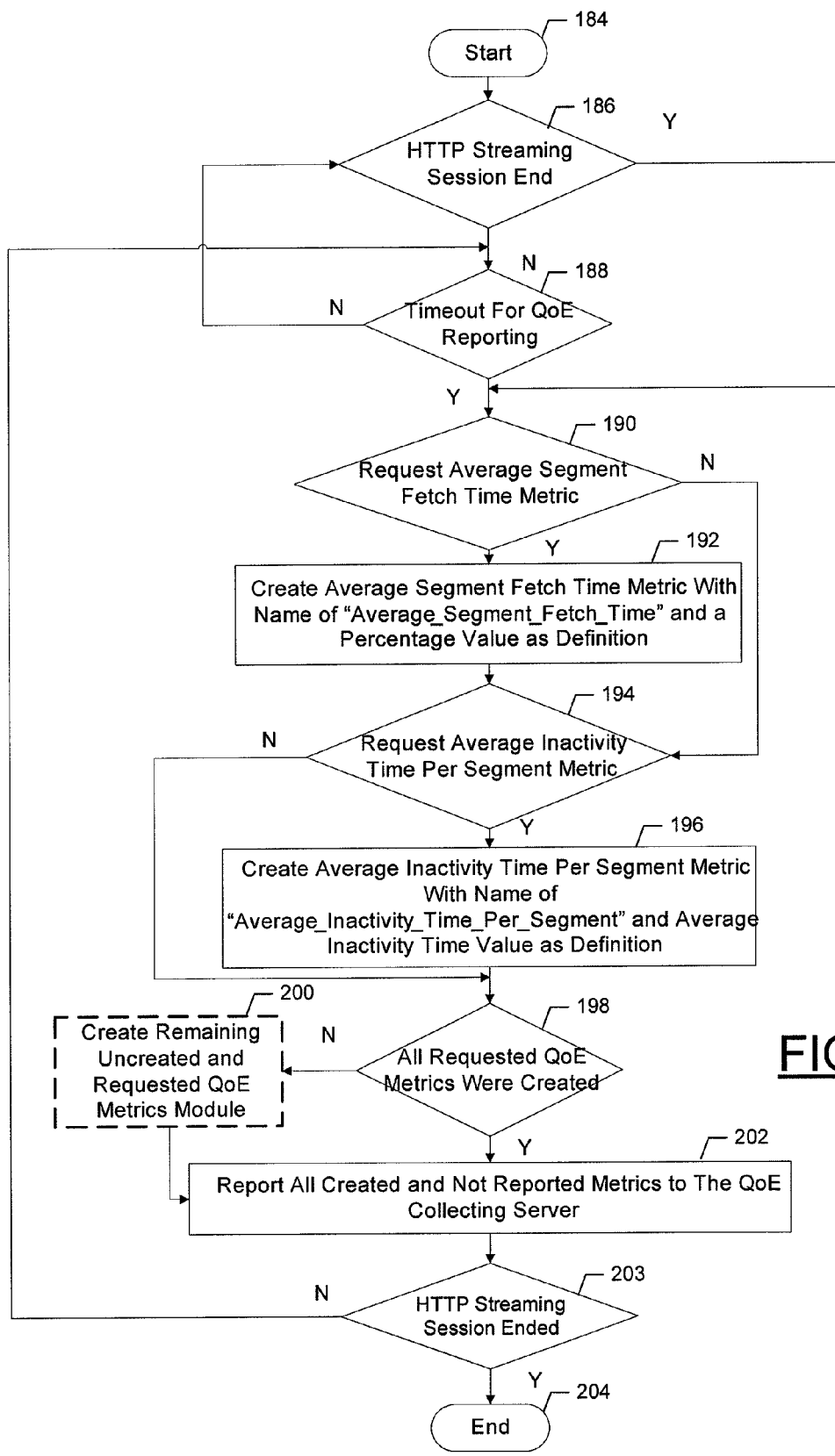
FIG. 5 illustrates a flowchart of an example method for performing quality of experience metric generation and reporting with respect to an average segment fetch time metric and a average inactivity time per segment metric according to an example embodiment of the present invention.

In view of the variety of example QoE metrics defined above and otherwise herein, FIGS. 3-5 provide example methods for generating and reporting particular metrics. While the example methods of FIGS. 3-5 describe a procedure with respect to particular metrics, it is contemplated that any of the metrics defined herein may be reported in accordance with the example methods of FIGS. 3-5. Additionally, while the example methods of FIGS. 3-5 are described with respect to HTTP streaming, it is contemplated that any type of streaming may be involved.

The example method of FIG. 3 involves the generation and reporting of a re-buffering event metric, a buffering time metric, and a buffered media time metric. The example method begins at 130 and proceeds to determining whether an HTTP streaming session or adaptive HTTP streaming session ended at 132. If the session has not ended, a determination may be made as to whether a client buffer underflow or re-buffing event has occurred at 134. If the session has ended at 132, the example method proceeds to 142. If a buffer underflow or re-buffering event has occurred, then a determination is made as to whether a request for the re-buffering event metric has been generated at 136. If a buffer underflow or re-buffering event has not occurred, the example method continues to 140. If a request for the re-buffering event metric has been generated at 136, then, at 138, a re-buffering event metric may be created with the name of "Rebuffering_Event", a value may be defined as the time position when re-buffering occurred, and the example method proceeds to 140. If a request for the re-buffering event metric has not been generated at 136, the example method proceeds to 140. At 140, a determination is made as to whether a timeout for the QoE reporting interval has occurred. If a timeout for the QoE reporting interval has not occurred, the example method may proceed to 132. If a timeout for the QoE reporting interval has occurred, a determination may be made as to whether a buffering time metric request has been generated at 142. If a request for the buffering time metric has been generated at 142, then, at 144, a buffering time metric may be created with the name of "Buffering_Time", a value may be defined as the time used for buffering, and the example method proceeds to 146. If a request for the buffering time metric has not been generated at 136, the example method proceeds to 146. If a request for the buffering time metric has been generated at 142, then, at 144, a buffering time metric may be created with the name of "Buffering_Time", a value may be defined as the time used for buffering, and the example method proceeds to 146. If a request for the buffering time metric has not been generated at 136, the example method proceeds to 146. At 146, a determination may be made as to whether a buffered media time metric request has been generated. If a request for the buffered media time metric has been generated at 146, then, at 148, a buffered media time metric may be created with the name of "Buffered_Media_Time", a value may be defined as the duration of buffered media, and the example method proceeds to 150. If a request for the buffered media time metric has not been generated at 146, the example method proceeds to 150. At 150, a determination is made as to whether all of the requested QoE metrics have been created. If all of the metrics have not been created, the remaining uncreated and requested QoE metrics are created at 152, and the example method proceeds to 154. If all of the metrics have been created, then all of the created and not reported metrics are reported to the QoE metric collecting server at 154, and the example method proceeds to 155. At 155, a determination is made as to whether the HTTP streaming session or adaptive HTTP streaming session has ended. If the session has ended, the example method proceeds to an end at 156. If the session has not ended, the example method proceeds to 134.

The example method of FIG. 4 involves the generation and reporting of a representation switch event metric and a representation switch duration metric. The example method begins at 160 and proceeds to determining whether an HTTP streaming session or adaptive HTTP streaming session ended at 162. If the session has ended, the example method proceeds to 176. If the session has not ended at 162, a determination is made as to whether the client has initiated a representation switch at 164. If the client has not initiated a representation switch, then the example method proceeds to 174. If the client has initiated a representation switch, then a determination is made as to whether a request for the representation switch event metric has been generated at 166. If a request for the representation switch event metric has been generated at 166, then, at 168, a representation switch event metric may be created with the name of "Representation_Switch_Event", a value may be defined as the time position when switch event occurred, and the example method proceeds to 170. If a request for the representation switch event metric has not been generated at 166, the example method proceeds to 174. At 170, a determination is made as to whether a request for the representation switch duration metric has been generated at 170. If a request for the representation switch duration metric has been generated at 170, then, at 172, a representation switch duration metric may be created with the name of "Representation_Switch_Duration", a value may be defined as the duration of time that elapses during the switch, and the example method proceeds to 174. If a request for the representation switch duration metric has not been generated at 170, the example method proceeds to 174. At 174, a determination is made as to whether a timeout for the QoE reporting interval has occurred. If a timeout for the QoE reporting interval has occurred, the example method may proceed to 176. If a timeout for the QoE reporting interval has not occurred, the example method proceeds to 162. At 176, a determination is made as to whether all of the requested QoE metrics have been created. If all of the metrics have not been created, the remaining uncreated and requested QoE metrics are created at 178, and the example method proceeds to 180. If all of the metrics have been created, then all of the created and not reported metrics are reported to the QoE metric collecting server at 180, and the example method proceeds to 181. At 181, a determination is made as to whether the HTTP streaming session or adaptive HTTP streaming session has ended. If the session has ended, the example method proceeds to an end at 182. If the session has not ended, the example method proceeds to 164.

The example method of FIG. 5 involves the generation and reporting of an average segment fetch time metric and an average inactivity time per segment metric. The example method begins at 184 and proceeds to determining whether an HTTP streaming session or adaptive HTTP streaming session ended at 186. If the session has ended, the example method proceeds to 190. If the session has not ended at 186, a determination is made as to whether a timeout for the QoE reporting interval has occurred. If a timeout for the QoE reporting interval has occurred, the example method may proceed to 190. If a timeout for the QoE reporting interval has not occurred, the example method proceeds to 186. At 190, a determination is made as to whether a request for the average segment fetch time metric has been generated. If a request for the average segment fetch time metric has been generated at 190, then, at 192, an average segment fetch time metric may be created with the name of "Average_Segment_Fetch_Time", a value may be defined as percentage, and the example method proceeds to 194. If a request for the average segment fetch time metric has not been generated at 190, the example method proceeds to 194. At 194, a determination is made as to whether a request for the average inactivity time per segment metric has been generated. If a request for the average inactivity time per segment metric has been generated at 194, then, at 196, an average inactivity time per segment metric may be created with the name of "Average_Inactivity_Time_Per_Segment", a value may be defined as the average inactivity time, and the example method proceeds to 198. If a request for the average inactivity time per segment metric has not been generated at 194, the example method proceeds to 198. At 198, a determination is made as to whether all of the requested QoE metrics have been created. If all of the metrics have not been created, the remaining uncreated and requested QoE metrics are created at 200, and the example method proceeds to 202. If all of the metrics have been created, then all of the created and not reported metrics are reported to the QoE metric collecting server at 202, and the example method proceeds to 203. At 203, a determination is made as to whether the HTTP streaming session or adaptive HTTP streaming session has ended. If the session has ended, the example method proceeds to an end at 204. If the session has not ended, the example method proceeds to 188.

Figure 8:
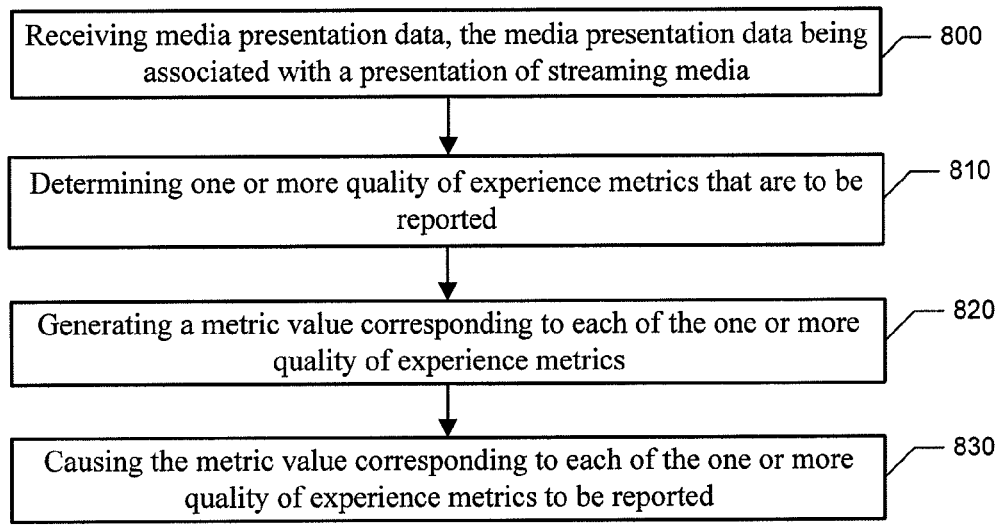
FIG. 8 is a flowchart of an example method for generating and reporting quality of experience metrics by a client device according to an example embodiment of the present invention.
Figure 9:
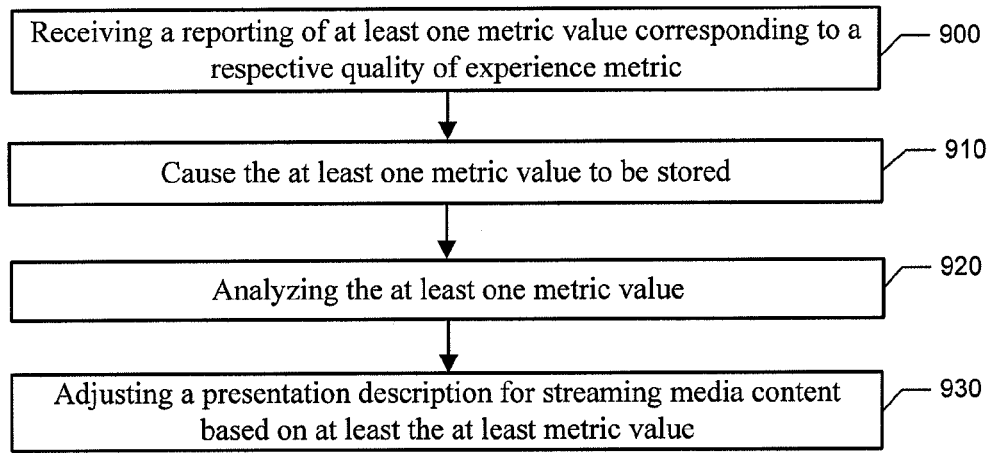
FIG. 9 is a flowchart of an example method for receiving and storing quality of experience metrics by a server according to an example embodiment of the present invention.

The description provided above and generally herein illustrates example methods and techniques, such as the example methods of FIGS. 2-5, that may be implemented by or in association with specially configured apparatuses, and example computer program products. In addition to the apparatuses described with respect to FIG. 1, FIGS. 8 and 9 depict example apparatuses that are configured to perform various functionalities as described herein, including those described with respect to operations of the flowcharts of FIGS. 2-5, 8, and 9, and the operation otherwise described herein.

Figure 6:
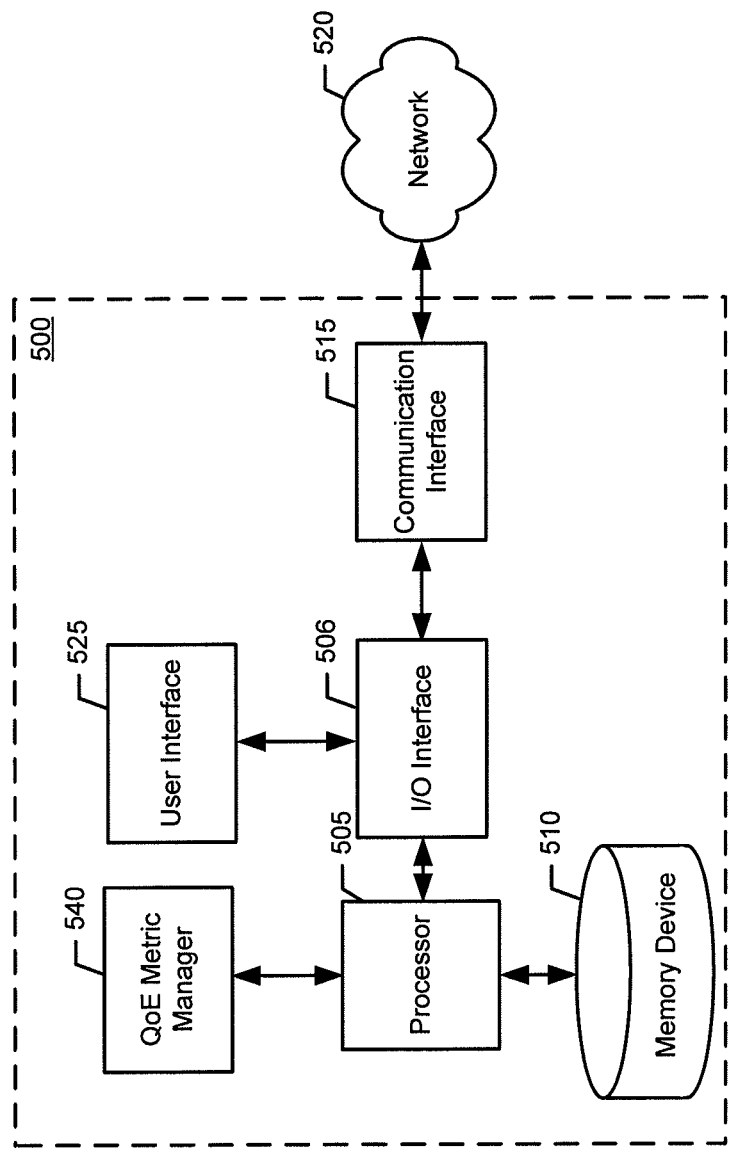
FIG. 6 illustrates a block diagram of an apparatus and associated system for generating and/or handling quality of experience metrics according to an example embodiment of the present invention.

Referring now to FIG. 6, an example embodiment of the present invention is depicted as apparatus 500. Apparatus 500 may, be embodied as, or included as a component of, a communications device with wired and/or wireless communications capabilities. With reference the apparatuses described in FIG. 1, the apparatus 500 may be an example embodiment of the QoE metric collecting server 104, the web server 106, or the client device 100.

Accordingly, in some example embodiments, the apparatus 500 may be part of a communications device, such as a stationary or a mobile communications terminal. As a mobile device, the apparatus 500 may be a mobile and/or wireless communications node such as, for example, a mobile and/or wireless server, computer, access point, communications switching device, handheld wireless device (e.g., telephone, portable digital assistant (PDA), mobile television, gaming device, camera, video recorder, audio/video player, radio, digital book reader, and/or a global positioning system (GPS) device), an in-vehicle navigation device, any combination of the aforementioned, or the like. As a stationary terminal, the apparatus 500 may be a desktop computer, a server, a stationary communications node, or the like. Regardless of the type of communications device, apparatus 500 may also include computing capabilities.

The example apparatus 500 includes or is otherwise in communication with a processor 505, a memory device 510, an Input/Output (I/O) interface 506, a communications interface 515, and a QoE metric manager 540. According to some example embodiments, such as in an instance where the apparatus 500 is embodied as the client device 100, the apparatus 500 may include a user interface 525. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like.

Memory device 510 may include a cache area for temporary storage of data. In this regard, some or all of memory device 510 may be included within the processor 505.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

The communication interface 515 may be any device or means embodied in hardware, a computer program product, or a combination of hardware and a computer program product that is configured to receive and/or transmit data from/to a network 520 and/or any other device or module in communication with the example apparatus 500. In some example embodiments, the communications interface 515 is configured to support the reception or transmission of steaming media content via, for example, HTTP streaming, and/or information associated with streaming media content. The communications interface may be configured to communicate information via any type of wired or wireless connection, and via any type of communications protocol, such as a communications protocol that supports cellular communications. According to various example embodiments, the communication interface 515 is configured to support the transmission and reception of communications in cellular networks. In this regard, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical or other output indications. The user interface 525 may include, for example, a keyboard, a mouse, a joystick, a display (e.g., a touch screen display), a microphone, a speaker, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500. The display circuitry may be configured to support and present steaming media, including streaming media provide via HTTP streaming.

The QoE metric manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the QoE metric manager 540 as described herein. In an example embodiment, the processor 505 includes, or controls, the QoE metric manager 540. The QoE metric manager 540 may be, partially or wholly, embodied as processors similar to, but separate from processor 505. In this regard, the QoE metric manager 540 may be in communication with the processor 505. In various example embodiments, the QoE metric manager 540 may, partially or wholly, reside on differing apparatuses such that some or all of the functionality of the QoE metric manager 540 may be performed by a first apparatus, and the remainder of the functionality of the QoE metric manager 540 may be performed by one or more other apparatuses.

Further, the apparatus 500 and the processor 505 may be configured to perform at least the following functionality via QoE metric manager 540. The QoE metric manager 540 may be configured to cause or direct the processor 505 and/or the apparatus 500 to perform various functionalities, such as those described with respect to FIGS. 1-5, 8 and 9 and as generally described herein.

For example, with reference to FIG. 8, the QoE metric manager 540 may be configured to cause the apparatus 500 to operate as the client device 100 of FIG. 1. In this regard, the QoE metric manager 540 may be configured to receive media presentation data at 800, where the media presentation data may be associated with a presentation of streaming media. Further, the QoE metric manager may be configured to determine one or more quality of experience metrics that are to be reported at 810, and generate a metric value corresponding to each of the one or more quality of experience metrics at 820. In some example embodiments, the quality of experience metrics may be determined based on at least a trigger/request by another entity, e.g., a request by a server, the media presentation data, a pre-configuration of the client device, and/or the like. Additionally, the QoE metric manager 540 may cause the metric value corresponding to each of the one or more quality of experience metrics to be reported at 830.

According to some example embodiments, the QoE metric manager 540 may be configured to generate and cause the reporting of metric values associated with any of the QoE metrics described herein. For example, the QoE metric manager 540 may be configured to generate a metric value corresponding to a re-buffering event metric, where the re-buffering event metric indicates a time position within a streaming media presentation that a re-buffering event occurred due to a buffer overflow. Additionally or alternatively, for example, the QoE metric manager 540 may be configured to generate a metric value corresponding to a buffering time metric that indicates a duration of time used to reach a threshold buffering time. Additionally or alternatively, for example, the QoE metric manager 540 may be configured to generate a metric value corresponding to a buffered media time metric that indicates a duration of media data that has been buffered but not yet presented. Additionally or alternatively, for example, the QoE metric manager 540 may be configured to generate a metric value corresponding to a representation switch metric that indicates a timestamp or time instant of a representation switch. Additionally or alternatively, for example, the QoE metric manager 540 may be configured to generate a metric value corresponding to a representation switch duration metric that indicates a duration of time that elapsed between the an initiation of a representation switch to a different representation and playback of a first portion of the different representation. Additionally or alternatively, for example, the QoE metric manager 540 may be configured to generate a metric value corresponding to an average segment fetch time metric that indicates a ratio average media segment fetch time to media segment duration. Additionally or alternatively, for example, the QoE metric manager 540 may be configured to generate a metric value corresponding to an average inactivity time per segment metric, the average inactivity time per segment metric being one of the one or more quality of experience metrics and the average inactivity time per segment metric indicating an average duration of time between reception of a last portion of a previous media segment and a transmission of a request for a next media segment. Additionally or alternatively, for example, the QoE metric manager 540 may be configured to generate a metric value corresponding to a representation playback time metric that indicates a sum of media time presented from a representation since a beginning of a period. Additionally or alternatively, for example, the QoE metric manager 540 may be configured to generate a metric value corresponding to a media segment not accessible metric that indicates an error event in an instance in which a media segment cannot be fetched.

The QoE metric manager 540 may also be configured to cause or direct the processor 505 and/or the apparatus 500 to perform functionality such as that described with respect to the QoE metric collecting server 104. With reference the flowchart of FIG. 9, the QoE metric manager 540 may be configured to receive a reporting of at least one metric value corresponding to a respective quality of experience metric at 900. The at least one metric value may be associated with at least one presentation of streaming media. Further, the QoE metric manager 540 may be configured cause the at least one metric value to be stored at 910. In some example embodiments, the QoE metric manager 540 may be configured to analyze the at least one metric value at 920 and adjust a presentation description for streaming media content based on at least the at least metric value at 930.

In some example embodiments, the QoE metric manager 540 may be configured to receive a reporting that includes a metric value corresponding to a re-buffering metric that indicates a time position within a streaming media presentation at which a re-buffering event occurred due to a buffer overflow. Additionally or alternatively, the QoE metric manager 540 may be configured to receive a reporting that includes a metric value corresponding to a buffering time metric that indicates a duration of time used to reach a threshold buffering time. Additionally or alternatively, the QoE metric manager 540 may be configured to receive a reporting that includes a metric value corresponding to a buffered media time metric that indicates a duration of media data that has been buffered but not yet presented. Additionally or alternatively, the QoE metric manager 540 may be configured to receive a reporting that includes a metric value corresponding to a representation switch event metric that indicates a timestamp or time instant of a representation switch. Additionally or alternatively, the QoE metric manager 540 may be configured to receive a reporting that includes a metric value corresponding to a representation switch duration metric that indicates a duration of time that elapsed between the an initiation of a representation switch to a different representation and playback of a first portion of the different representation. Additionally or alternatively, the QoE metric manager 540 may be configured to receive a reporting that includes a metric value corresponding to an average segment fetch time metric that indicates a ratio average media segment fetch time to media segment duration. Additionally or alternatively, the QoE metric manager 540 may be configured to receive a reporting that includes a metric value corresponding to an average inactivity time per segment metric that indicates an average duration of time between reception of a last portion of a previous media segment and a transmission of a request for a next media segment. Additionally or alternatively, the QoE metric manager 540 may be configured to receive a reporting that includes a metric value corresponding to a representation playback time metric that indicates a sum of media time presented from a representation since a beginning of a period. Additionally or alternatively, the QoE metric manager 540 may be configured to receive a reporting that includes a metric value corresponding to a media segment not accessible metric that indicates an error event in an instance in which a media segment cannot be fetched. In some example embodiments, the QoE metric manager 540 is configured to provide a network entity with access to the stored QoE metrics to facilitate analysis of the QoE metrics by the network entity.

Figure 7:
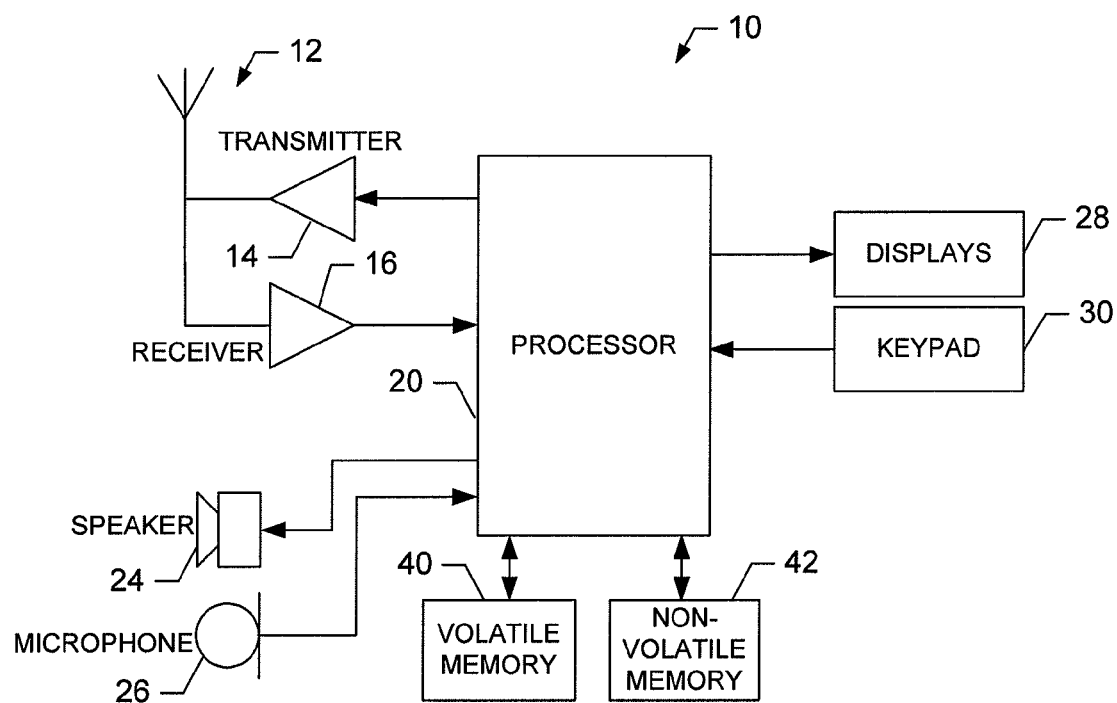
FIG. 7 illustrates a block diagram of a mobile terminal configured for generating and/or handling quality of experience metrics according to an example embodiment of the present invention.

Referring now to FIG. 7, a more specific example apparatus in accordance with various embodiments of the present invention is provided. The example apparatus of FIG. 7 is a mobile terminal 10 configured to communicate within a wireless network, such as a cellular communications network. The mobile terminal 10 may be configured to perform the functionality of apparatus 500 as described herein. More specifically, the mobile terminal 10 may be caused to perform the functionality described with respect to FIGS. 1-5, 8, and 9 or the functionality described with respect to the QoE metric manager 540 via the processor 20. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, displays 28 (which may be touch screen displays), and the keypad 30 may be included as parts of a user interface.

FIGS. 2-5, 8, and 9 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIGS. 2-5, 8, and 9 and otherwise described herein may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Additional example embodiments are also provided, such as an example method as described with or without modification or amplification below. According to some example embodiments, an apparatus comprising at least one processor and at least one memory including computer program code, the at least one memory and the computer program code configured to, with the at least one processor, cause the apparatus at least to perform the example method is provided. Further, according to some example embodiments, a computer program product including a tangible memory having computer program code stored thereon, the computer program code being configured to cause an apparatus to perform the example method is provided. Additionally, an apparatus is provided that includes means for performing each of the operations of the example method.

In this regard, the example method may comprise receiving media presentation data, where the media presentation data is associated with a presentation of streaming media; determining one or more quality of experience metrics that are to be reported; generating a metric value corresponding to each of the one or more quality of experience metrics; and causing the metric value corresponding to each of the one or more quality of experience metrics to be reported. In some example embodiments, generating the metric value includes generating the metric value corresponding to a re-buffering event metric, the re-buffering event metric being one of the one or more quality of experience metrics and the re-buffering event metric indicating a time position within a streaming media presentation that a re-buffering event occurred due to a buffer overflow. In some example embodiments, generating the metric value includes generating the metric value corresponding to a buffering time metric, the buffering time metric being one of the one or more quality of experience metrics and the buffering time metric indicating a duration of time used to reach a threshold buffering time. In some example embodiments, generating the metric value includes generating the metric value corresponding to a buffered media time metric, the buffered media time metric being one of the one or more quality of experience metrics and the buffered media time metric indicating a duration of media data that has been buffered but not yet presented. In some example embodiments, generating the metric value includes generating the metric value corresponding to a representation switch metric, the representation switch metric being one of the one or more quality of experience metrics and the representation switch event metric indicating a timestamp or time instant of a representation switch. In some example embodiments, generating the metric value includes generating the metric value corresponding to a representation switch duration metric, the representation switch duration metric being one of the one or more quality of experience metrics and the representation switch duration metric indicating a duration of time that elapsed between the an initiation of a representation switch to a different representation and playback of a first portion of the different representation. In some example embodiments, generating the metric value includes generating the metric value corresponding to an average segment fetch time metric, the average segment fetch time metric being one of the one or more quality of experience metrics and the average segment fetch time metric indicating a ratio average media segment fetch time to media segment duration. In some example embodiments, generating the metric value includes generating the metric value corresponding to an average inactivity time per segment metric, the average inactivity time per segment metric being one of the one or more quality of experience metrics and the average inactivity time per segment metric indicating an average duration of time between reception of a last portion of a previous media segment and a transmission of a request for a next media segment. In some example embodiments, generating the metric value includes generating the metric value corresponding to a representation playback time metric, the representation playback time metric being one of the one or more quality of experience metrics and the representation playback time metric indicating a sum of media time presented from a representation since a beginning of a period. In some example embodiments, generating the metric value includes generating the metric value corresponding to a media segment not accessible metric, the media segment not accessible metric being one of the one or more quality of experience metrics and the media segment not accessible metric indicating an error event in an instance in which a media segment cannot be fetched. According to various example embodiments, the at least one generated and reported metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

Additional example embodiments are also provided, such as another example method as described with or without modification or amplification below. According to some example embodiments, an apparatus comprising at least one processor and at least one memory including computer program code, the at least one memory and the computer program code configured to, with the at least one processor, cause the apparatus at least to perform this example method is provided. Further, according to some example embodiments, a computer program product including a tangible memory having computer program code stored thereon, the computer program code being configured to cause an apparatus to perform the example method is provided. Additionally, an apparatus is provided that includes means for performing each of the operations of the example method.

According to some example embodiments, the example method comprises receiving a reporting of at least one metric value corresponding to a respective quality of experience metric, the at least one metric value being associated with at least one presentation of streaming media; and causing the at least one metric value to be stored. In some example embodiments, receiving the reporting includes receiving a metric value corresponding to a re-buffering metric that indicates a time position within a streaming media presentation at which a re-buffering event occurred due to a buffer overflow. In some example embodiments, receiving the reporting includes receiving a metric value corresponding to a buffering time metric that indicates a duration of time used to reach a threshold buffering time. In some example embodiments, receiving the reporting includes receiving a metric value corresponding to a buffered media time metric that indicates a duration of media data that has been buffered but not yet presented. In some example embodiments, receiving the reporting includes receiving a metric value corresponding to a representation switch event metric that indicates a timestamp or time instant of a representation switch. In some example embodiments, receiving the reporting includes receiving a metric value corresponding to a representation switch duration metric that indicates a duration of time that elapsed between the an initiation of a representation switch to a different representation and playback of a first portion of the different representation. In some example embodiments, receiving the reporting includes receiving a metric value corresponding to an average segment fetch time metric that indicates a ratio average media segment fetch time to media segment duration. In some example embodiments, receiving the reporting includes receiving a metric value corresponding to an average inactivity time per segment metric that indicates an average duration of time between reception of a last portion of a previous media segment and a transmission of a request for a next media segment. In some example embodiments, receiving the reporting includes receiving a metric value corresponding to a representation playback time metric that indicates a sum of media time presented from a representation since a beginning of a period. In some example embodiments, receiving the reporting includes receiving a metric value corresponding to a media segment not accessible metric that indicates an error event in an instance in which a media segment cannot be fetched. In some example embodiments, the example method further comprises analyzing the at least one metric value and adjusting a presentation description for streaming media content based on at least the at least metric value. In some example embodiments, the example method further comprises providing a network entity with access to the stored QoE metrics to facilitate analysis of the QoE metrics by the network entity. According to various example embodiments, the at least one received metric value may correspond to one or more QoE metrics, such as, for example, a re-buffering event metric, a buffering time metric, a buffered media time metric, a representation switch event metric, a representation switch duration metric, a representation switch time metric, an average segment fetch time metric, a media time variance of early segment metric, a throughput variance of early segment metric, a media time variance of late segment metric, a throughput variance of late segment metric, an average inactivity time per segment metric, a sleeping duration metric, a representation playback time metric, a representation-x-duration metric, a media segment not accessible metric, a MPD change or initialization time metric, a abandoned media durations metric, a playback starting time metric, a bitrate jitter duration metric, a throughput variance in a representation metric, a network connection bandwidth metric, or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, by a client device, media presentation data, the media presentation data being associated with a presentation of streaming media;
    determining one or more quality of experience (QoE) metrics that are to be reported, wherein said QoE metrics represent data streaming parameters measurable or calculable during a streaming media event, and wherein at least one of the one or more QoE metrics comprises a representation switch duration metric indicating a duration of time that elapsed between an initiation of a representation switch to a different representation and playback of a first portion of the different representation;
    generating a metric value corresponding to each of the one or more QoE metrics; and
    causing the metric value corresponding to each of the one or more QoE metrics to be reported.

2. The method of claim 1, wherein generating the metric value further comprises at least one of:
    generating the metric value corresponding to a re-buffering event metric, the re-buffering event metric being one of the one or more quality of experience metrics and the re-buffering event metric indicating a time position within a streaming media presentation that a re-buffering event occurred due to a buffer underflow;
    generating the metric value corresponding to a buffering time metric, the buffering time metric being one of the one or more QoE metrics and the buffering time metric indicating a duration of time used to reach a threshold or a signaled minimum buffering time;
    generating the metric value corresponding to a buffered media time metric, the buffered media time metric being one of the one or more QoE metrics and the buffered media time metric indicating a duration of media data that has been buffered but not yet presented;
    generating the metric value corresponding to a representation switch metric, the representation switch metric being one of the one or more QoE metrics and the representation switch event metric indicating a time instant of a representation switch;
    generating the metric value corresponding to an average segment fetch time metric, the average segment fetch time metric being one of the one or more QoE metrics and the average segment fetch time metric indicating a ratio average media segment fetch time to media segment duration;
    generating the metric value corresponding to an average inactivity time per segment metric, the average inactivity time per segment metric being one of the one or more QoE metrics and the average inactivity time per segment metric indicating an average duration of time between reception of a last portion of a previous media segment and a transmission of a request for a next media segment;
    generating the metric value corresponding to a representation playback time metric, the representation playback time metric being one of the one or more QoE metrics and the representation playback time metric indicating a sum of media time presented from a representation since a beginning of a period; and
    generating the metric value corresponding to a media segment not accessible metric, the media segment not accessible metric being one of the one or more QoE metrics and the media segment not accessible metric indicating an error event in an instance in which a media segment cannot be fetched.

3. An apparatus comprising at least one processor and at least one memory including computer program code, the at least one memory and the computer program code configured to, with the at least one processor, direct the apparatus at least to:
    receive media presentation data, the media presentation data being associated with a presentation of streaming media;
    determine one or more quality of experience (QoE) metrics that are to be reported, wherein said QoE metrics represent data streaming parameters measurable or calculable during a streaming media event, and wherein at least one of the QoE metrics comprises a representation switch duration metric indicating a duration of time that elapsed between an initiation of a representation switch to a different representation and playback of a first portion of the different representation;
    generate a metric value corresponding to each of the one or more QoE metrics; and
    cause the metric value corresponding to each of the one or more QoE metrics to be reported.

4. The apparatus of claim 3, wherein being directed to generate the metric value further comprises at least one of:
    being directed to generate the metric value corresponding to a re-buffering event metric, the re-buffering event metric being one of the one or more QoE metrics and the re-buffering event metric indicating a time position within a streaming media presentation that a re-buffering event occurred due to a buffer underflow;
    being directed to generate the metric value corresponding to a buffering time metric, the buffering time metric being one of the one or more QoE metrics and the buffering time metric indicating a duration of time used to reach a threshold or a signaled minimum buffering time;
    being directed to generate the metric value corresponding to a buffered media time metric, the buffered media time metric being one of the one or more QoE metrics and the buffered media time metric indicating a duration of media data that has been buffered but not yet presented;
    being directed to generate the metric value corresponding to a representation switch metric, the representation switch metric being one of the one or more QoE metrics and the representation switch event metric indicating a time instant of a representation switch;
    being directed to generate the metric value corresponding to an average segment fetch time metric, the average segment fetch time metric being one of the one or more QoE and the average segment fetch time metric indicating a ratio average media segment fetch time to media segment duration;
    being directed to generate the metric value corresponding to an average inactivity time per segment metric, the average inactivity time per segment metric being one of the one or more QoE metrics and the average inactivity time per segment metric indicating an average duration of time between reception of a last portion of a previous media segment and a transmission of a request for a next media segment;
    being directed to generate the metric value corresponding to a representation playback time metric, the representation playback time metric being one of the one or more QoE metrics and the representation playback time metric indicating a sum of media time presented from a representation since a beginning of a period; and
    being directed to generate the metric value corresponding to a media segment not accessible metric, the media segment not accessible metric being one of the one or more QoE metrics and the media segment not accessible metric indicating an error event in an instance in which a media segment cannot be fetched.

5. The apparatus of claim 3, wherein the apparatus comprises at least one of a mobile terminal and a personal computer.

6. The apparatus of claim 5, wherein the apparatus further comprises user interface circuitry and components including a display configured to display the streaming video in accordance with the media presentation data.

7. A method comprising:
receiving in a computing device a reporting of at least one metric value corresponding to a respective quality of experience (QoE) metric, the at least one metric value being associated with at least one presentation of streaming media, wherein a QoE metric represents a data streaming parameter measurable or calculable during a streaming media event, and wherein the at least one metric value includes a metric value corresponding to a representation switch duration metric indicating a duration of time that elapsed between an initiation of a representation switch to a different representation and playback of a first portion of the different representation; and
causing the at least one metric value to be stored.

8. The method of claim 7, wherein receiving the reporting further comprises at least one of:
receiving a metric value corresponding to a re-buffering metric that indicates a time position within a streaming media presentation at which a re-buffering event occurred due to a buffer underflow;
receiving a metric value corresponding to a buffering time metric that indicates a duration of time used to reach a threshold or a signaled minimum buffering time;
receiving a metric value corresponding to a buffered media time metric that indicates a duration of media data that has been buffered but not yet presented;
receiving a metric value corresponding to a representation switch event metric that indicates a time instant of a representation switch;
receiving a metric value corresponding to an average segment fetch time metric that indicates a ratio average media segment fetch time to media segment duration;
receiving a metric value corresponding to an average inactivity time per segment metric that indicates an average duration of time between reception of a last portion of a previous media segment and a transmission of a request for a next media segment;
receiving a metric value corresponding to a representation playback time metric that indicates a sum of media time presented from a representation since a beginning of a period;
receiving a metric value corresponding to a media segment not accessible metric that indicates an error event in an instance in which a media segment cannot be fetched.

9. The method of claim 8, further comprising analyzing the at least one metric value and adjusting a presentation description for streaming media content based, at least in part, on the at least one metric value.

10. An apparatus comprising at least one processor and at least one memory including computer program code, the at least one memory and the computer program code configured to, with the at least one processor, direct the apparatus at least to:
receive a reporting of at least one metric value corresponding to a respective quality of experience (QoE) metric, the at least one metric value being associated with at least one presentation of streaming media, wherein a QoE metric represents a data streaming parameter measurable or calculable during a streaming media event, and wherein the at least one metric value includes a metric value corresponding to a representation switch duration metric indicating a duration of time that elapsed between an initiation of a representation switch to a different representation and playback of a first portion of the different representation; and
cause the at least one metric value to be stored.

11. The apparatus of claim 10, wherein being directed to receive the reporting further comprises at least one of:
being directed to receive a metric value corresponding to a re-buffering metric that indicates a time position within a streaming media presentation at which a re-buffering event occurred due to a buffer underflow;
being directed to receive a metric value corresponding to a buffering time metric that indicates a duration of time used to reach a threshold or a signaled minimum buffering time;
being directed to receive a metric value corresponding to a buffered media time metric that indicates a duration of media data that has been buffered but not yet presented;
being directed to receive a metric value corresponding to a representation switch event metric that indicates a time instant of a representation switch;
being directed to receive a metric value corresponding to an average segment fetch time metric that indicates a ratio average media segment fetch time to media segment duration;
being directed to receive a metric value corresponding to an average inactivity time per segment metric that indicates an average duration of time between reception of a last portion of a previous media segment and a transmission of a request for a next media segment;
being directed to receive a metric value corresponding to a representation playback time metric that indicates a sum of media time presented from a representation since a beginning of a period; and
being directed to receive a metric value corresponding to a media segment not accessible metric that indicates an error event in an instance in which a media segment cannot be fetched.

12. The apparatus of claim 10, wherein the apparatus is further directed to analyze the at least one metric value and adjust a presentation description for streaming media content based, at least in part, on the at least one metric value.

13. The apparatus of claim 10, wherein the apparatus comprises a metric collecting server.

14. The apparatus of claim 13, wherein the apparatus further comprises communications interface circuitry and components configured to receive the reporting via a communications network.

15. A computer program product comprising a non-transitory computer readable storage medium having computer program code stored thereon, wherein the computer program code, when executed by a processor, is configured to cause an apparatus to perform at least the following:
receive media presentation data, the media presentation data being associated with a presentation of streaming media;
determine one or more quality of experience (QoE) metrics that are to be reported, wherein said QoE metrics represent data streaming parameters measurable or calculable during a streaming media event, and wherein at least one of the QoE metrics comprises a representation switch duration metric indicating a duration of time that elapsed between an initiation of a representation switch to a different representation and playback of a first portion of the different representation;

generate a metric value corresponding to each of the one or more QoE metrics; and cause the metric value corresponding to each of the one or more QoE metrics to be reported.

16. The computer program product of claim 15, wherein generating the metric value further comprises at least one of:

generating the metric value corresponding to a re-buffering event metric, the re-buffering event metric being one of the one or more QoE metrics and the re-buffering event metric indicating a time position within a streaming media presentation that a re-buffering event occurred due to a buffer underflow;

generating the metric value corresponding to a buffering time metric, the buffering time metric being one of the one or more QoE metrics and the buffering time metric indicating a duration of time used to reach a threshold or a signaled minimum buffering time;

generating the metric value corresponding to a buffered media time metric, the buffered media time metric being one of the one or more QoE metrics and the buffered media time metric indicating a duration of media data that has been buffered but not yet presented;

generating the metric value corresponding to a representation switch metric, the representation switch metric being one of the one or more QoE metrics and the representation switch event metric indicating a time instant of a representation switch;

generating the metric value corresponding to an average segment fetch time metric, the average segment fetch time metric being one of the one or more QoE metrics and the average segment fetch time metric indicating a ratio average media segment fetch time to media segment duration;

generating the metric value corresponding to an average inactivity time per segment metric, the average inactivity time per segment metric being one of the one or more QoE metrics and the average inactivity time per segment metric indicating an average duration of time between reception of a last portion of a previous media segment and a transmission of a request for a next media segment;

generating the metric value corresponding to a representation playback time metric, the representation playback time metric being one of the one or more QoE metrics and the representation playback time metric indicating a sum of media time presented from a representation since a beginning of a period; and generating the metric value corresponding to a media segment not accessible metric, the media segment not accessible metric being one of the one or more QoE metrics and the media segment not accessible metric indicating an error event in an instance in which a media segment cannot be fetched.

17. A computer program product comprising a non-transitory computer readable storage medium having computer program code stored thereon, wherein the computer program code, when executed by a processor, is configured to cause an apparatus to perform at least the following:

receive a reporting of at least one metric value corresponding to a respective quality of experience (QoE) metric, the at least one metric value being associated with at least one presentation of streaming media, wherein a QoE metric represents a data streaming parameter measurable or calculable during a streaming media event, and wherein the at least one metric value includes a metric value corresponding to a representation switch duration metric indicating a duration of time that elapsed between an initiation of a representation switch to a different representation and playback of a first portion of the different representation; and cause the at least one metric value to be stored.

18. The computer program product of claim 17, wherein receiving the reporting further comprises at least one of:

receiving a metric value corresponding to a re-buffering metric that indicates a time position within a streaming media presentation at which a re-buffering event occurred due to a buffer underflow;

receiving a metric value corresponding to a buffering time metric that indicates a duration of time used to reach a threshold or a signaled minimum buffering time;

receiving a metric value corresponding to a buffered media time metric that indicates a duration of media data that has been buffered but not yet presented;

receiving a metric value corresponding to a representation switch event metric that indicates a time instant of a representation switch;

receiving a metric value corresponding to an average segment fetch time metric that indicates a ratio average media segment fetch time to media segment duration;

receiving a metric value corresponding to an average inactivity time per segment metric that indicates an average duration of time between reception of a last portion of a previous media segment and a transmission of a request for a next media segment;

receiving a metric value corresponding to a representation playback time metric that indicates a sum of media time presented from a representation since a beginning of a period;

receiving a metric value corresponding to a media segment not accessible metric that indicates an error event in an instance in which a media segment cannot be fetched.

19. The computer program product of claim 17, wherein the computer program code, when executed by the processor, is further configured to cause the apparatus to analyze the at least one metric value and adjust a presentation description for streaming media content based, at least in part, on the at least one metric value.

* * * * *